US011761571B2

(12) United States Patent
Traidia et al.

(10) Patent No.: US 11,761,571 B2
(45) Date of Patent: Sep. 19, 2023

(54) APPARATUS AND METHOD FOR ELECTROFUSION WELDING OF REINFORCED THERMOSETTING RESIN PIPE JOINTS

(71) Applicants: SAUDI ARABIAN OIL COMPANY, Dhahran (SA); TWI Ltd., Cambridge (GB)

(72) Inventors: Abderrazak Traidia, Lussan (FR); Abdullah Al Shahrani, Dammam (SA); Chris Worrall, Cambridge (GB); Farshad Salamat-Zadeh, Cambridge (GB); Waleed Al Nasser, Ad Dammam (SA); Thibault Tarik Villette, Belfort (FR)

(73) Assignees: SAUDI ARABIAN OIL COMPANY, Dhahran (SA); SAUDI ARAMCO TECHNOLOGIES COMPANY, Dhahran (SA)

( * ) Notice: Subject to any disclaimer, the term of this patent is extended or adjusted under 35 U.S.C. 154(b) by 0 days.

(21) Appl. No.: 17/380,562

(22) Filed: Jul. 20, 2021

(65) Prior Publication Data

US 2022/0018479 A1 Jan. 20, 2022

Related U.S. Application Data

(60) Provisional application No. 63/053,915, filed on Jul. 20, 2020.

(51) Int. Cl.
*F16L 47/03* (2006.01)
*B29C 65/34* (2006.01)
*B29L 31/24* (2006.01)

(52) U.S. Cl.
CPC .......... *F16L 47/03* (2013.01); *B29C 65/3424* (2013.01); *B29C 65/3468* (2013.01); *B29C 65/3476* (2013.01); *B29L 2031/24* (2013.01)

(58) Field of Classification Search
None
See application file for complete search history.

(56) References Cited

U.S. PATENT DOCUMENTS

| 170,473 A | 11/1875 | Flagler et al. |
| 2,559,806 A | 7/1951 | Thompson |

(Continued)

FOREIGN PATENT DOCUMENTS

| CA | 2116083 A1 | 8/1994 |
| CN | 1086763 A | 5/1994 |

(Continued)

OTHER PUBLICATIONS

International Search Report and Written Opinion of the International Searching Authority issued in corresponding International Application No. PCT/US2021/042296, dated Oct. 14, 2021 (14 pages).

(Continued)

*Primary Examiner* — Jacob T Minskey
*Assistant Examiner* — Adrianna N Konves
(74) *Attorney, Agent, or Firm* — Osha Bergman Watanabe & Burton LLP

(57) ABSTRACT

A system for coupling pipes includes a first pipe having a tapered, spigot end; a second pipe having a tapered, spigot end; and a coupler having two tapered socket ends adapted to internally receive the respective tapered, spigot ends of the first pipe and the second pipe. The first pipe and the second pipe are made from a reinforced thermosetting resin (RTR). The coupler comprising a resistive element implanted therein and connected to electrodes extending to an exterior of the coupler. A thermoplastic material is disposed between an exterior of the first pipe and an interior of the coupler. A thermoplastic material is disposed between an exterior of the second pipe and the interior of the coupler.

(Continued)

Upon application of electricity to the electrodes, the resistive elements are heated sufficiently to melt the thermoplastic material such that, when the heat is removed, the hardened thermoplastic material seals the first pipe and the second pipe to the coupler. A method of coupling pipes includes disposing a thermoplastic material between an exterior of a first pipe and an interior of a coupler; disposing a thermoplastic material between an exterior of a second pipe and the interior of the coupler; inserting the first pipe and the second pipe into the coupler; and applying of electricity to electrodes of the coupler such that resistive elements of the coupler heat sufficiently to melt the thermoplastic material such that, when the heat is removed, the hardened thermoplastic material seals the first pipe and the second pipe to the coupler.

7 Claims, 8 Drawing Sheets

(56) References Cited

U.S. PATENT DOCUMENTS

| | | | |
|---|---|---|---|
| 2,958,906 | A | 11/1960 | Youthed |
| 3,002,871 | A | 10/1961 | Tramm et al. |
| 3,061,503 | A | 10/1962 | Gould et al. |
| 3,307,997 | A | 3/1967 | Detrick |
| 3,506,519 | A | 4/1970 | Blumenkranz |
| 3,946,761 | A | 3/1976 | Thompson et al. |
| 4,090,899 | A | 5/1978 | Reich |
| 4,530,521 | A * | 7/1985 | Nyffeler .............. B29C 66/5221 285/21.2 |
| 4,662,655 | A | 5/1987 | Fliervoet et al. |
| 4,865,674 | A | 9/1989 | Durkin |
| 5,106,130 | A | 4/1992 | Ellsworth et al. |
| 5,152,855 | A | 10/1992 | Jansman et al. |
| 5,186,500 | A | 2/1993 | Folkers |
| 5,213,379 | A | 5/1993 | Taniguchi et al. |
| 5,264,059 | A | 11/1993 | Jacaruso et al. |
| 5,758,731 | A | 6/1998 | Zollinger |
| 5,785,092 | A | 7/1998 | Friedrich et al. |
| 6,131,954 | A | 10/2000 | Campbell |
| 6,521,072 | B1 | 2/2003 | Campbell |
| 7,240,697 | B2 | 7/2007 | Beebe et al. |
| 8,424,924 | B2 | 4/2013 | LaMarca et al. |
| 8,522,827 | B2 | 9/2013 | Lazzara et al. |
| 8,746,747 | B2 | 6/2014 | McPherson |
| 9,285,063 | B2 | 3/2016 | Jones |
| 9,358,764 | B2 | 6/2016 | Prebil et al. |
| 9,523,447 | B2 | 12/2016 | Conrad |
| 9,528,638 | B2 | 12/2016 | Hooberman |
| 9,534,719 | B2 | 1/2017 | Eccleston et al. |
| 9,810,359 | B2 | 11/2017 | Spears et al. |
| 2004/0222627 | A1 | 11/2004 | Krah |
| 2006/0279084 | A1 | 12/2006 | Collins |
| 2009/0277579 | A1 | 11/2009 | Marelli et al. |
| 2013/0036604 | A1* | 2/2013 | Schmidt .................. F16L 25/01 29/825 |
| 2013/0140811 | A1 | 6/2013 | Fahrer et al. |
| 2013/0175797 | A1 | 7/2013 | Kanao |
| 2014/0137971 | A1 | 5/2014 | Lundman |
| 2014/0220356 | A1 | 8/2014 | Van Tooren |
| 2014/0363220 | A1 | 12/2014 | Auer et al. |
| 2014/0375047 | A1 | 12/2014 | Jones |
| 2019/0128458 | A1 | 5/2019 | Kimball et al. |

FOREIGN PATENT DOCUMENTS

| | | |
|---|---|---|
| CN | 1263977 C | 7/2006 |
| CN | 104708890 B | 12/2018 |
| CN | 110131511 A | 8/2019 |
| CN | 110823481 A | 2/2020 |
| DE | 939719 C | 3/1956 |
| DE | 199 11 284 A1 | 9/2000 |
| EP | 0382593 A2 | 8/1990 |
| EP | 2340389 A2 | 7/2011 |
| EP | 2694273 A2 | 2/2014 |
| EP | 3717736 B1 | 3/2022 |
| GB | 775223 A | 5/1957 |
| GB | 775233 A | 5/1957 |
| GB | 1 329 364 A | 9/1973 |
| GB | 2033394 A | 5/1980 |
| GB | 2 271 958 A | 5/1994 |
| GB | 2425337 A | 10/2006 |
| JP | H10-281383 A | 10/1998 |
| JP | 2002-295780 A | 10/2002 |
| JP | 2003-130276 A | 5/2003 |
| JP | 2009018576 A | 1/2009 |
| WO | 96/26380 A1 | 8/1996 |
| WO | 00/55538 A1 | 9/2000 |
| WO | 2005025836 A1 | 3/2005 |
| WO | 2008028224 A1 | 3/2008 |
| WO | 2009/007537 A1 | 1/2009 |
| WO | 2020/007924 A1 | 1/2020 |

OTHER PUBLICATIONS

International Search Report and Written Opinion of the International Searching Authority issued in corresponding International Application No. PCT/US2021/042330, dated Oct. 15, 2021 (24 pages).

International Search Report and Written Opinion of the International Searching Authority issued in corresponding International Application No. PCT/US2021/042308, dated Oct. 15, 2021 (14 pages).

Van Moorleghem, Régis, "Welding of thermoplastic to thermoset composites through a thermoplastic interlayer"; TUDelft: Delft University of Technology; Jun. 2, 2016; <http://resolver.tudelft.nl/uuid:821d5aaf-99a8-4fc7-a32d-eadb5d104aa9>; Accessed Jun. 16, 2020 (67 pages).

Villegas, Irene Fernandez et al., "Ultrasonic welding of carbon/epoxy and carbon/PEEK composites through a PEI thermoplastic coupling layer"; Composites Part A: Applied Science and Manufacturing; vol. 109; pp. 75-83; Jun. 2018; <https://doi.org/10.1016/j.compositesa.2018.02.022> (32 pages).

Hamade, Ramsey F. et al., "Rotary Friction Welding versus Fusion Butt Welding of Plastic Pipes—Feasibility and Energy Perspective"; Procedia Manufacturing; vol. 33; pp. 693-700; 2019 (8 pages).

Beiss, T. et al., "Vibration Joining of Fiber-Reinforced Termosets"; Polymer Composites; vol. 31, Issue 7; pp. 1205-1212; Jul. 2010 (8 pages).

Yousefpour, Ali et al., "Fusion Bonding/Welding of Thermoplastic Composites"; Journal of Thermoplastic Compostie Materials; vol. 17; Issue 4; pp. 303-341; Jul. 2004 (39 pages).

Dell'Anna, Riccardo et al., "Lay-Up and Consolidation of a Composite Pipe by In Situ Ultrasonic Welding of a Thermoplastic Matrix Composite Tape"; MDPI Open Access Journals: Minerals; vol. 11, Issue 5: 786; pp. 1-11, May 11, 2018 (11 pages).

Ageorges, C., et al. "Advances in fusion bonding techniques for joining thermoplastic matrix composites: a review", Composites Part A: Applied Science and Manufacturing. Elsevier, vol. 32, No. 6. Jun. 1, 2001, pp. 839-857, (19 Pages).

Hou, Meng. "Thermoplastic Adhesive for Thermosetting Composites", Materials Science Forum vols. 706-709. Jan. 3, 2012, pp. 2968-2973, (7 Pages).

Nomura, H., et al. "Linear Vibration Welding of Polyethylene Pipes", In Proceedings of the 10th Plastic Pipes, Plastic Pipes Conference Association, Gothenburg, Sweden Sep. 1998, pp. 669-678, (10 Pages).

Troughton, et al. "Linear Vibration Welding of Polyethylene Pipes", In Proceedings of the 10th Plastic Pipes, Plastic Pipes Conference Association, Gothenburg, Sweden. Sep. 1998, pp. 424-432, (9 Pages).

Non-Final Office Action issued in corresponding U.S. Appl. No. 17/380,885, dated Aug. 18, 2022 (19 pages).

(56) References Cited

OTHER PUBLICATIONS

O. Schieler et al., "Induction Welding of Hybrid Thermoplastic-thermoset Composite Parts", KMUTNB Int J Appl Sci Technol., 2016, vol. 9, No. 1, pp. 27-36 (10 pages).

* cited by examiner

Tie layer on the coupler side
Resistive implants in the coupler

Tie layer on the coupler side
Resistive implants in the tie layer

Tie layer on the RTR pipe side
Resistive implants in the coupler

Step 1

Step 2

Step 3

APPARATUS AND METHOD FOR ELECTROFUSION WELDING OF REINFORCED THERMOSETTING RESIN PIPE JOINTS

BACKGROUND OF INVENTION

RTR (Reinforced Thermosetting Resin) pipe is an acronym given to a broad family of fiber reinforced thermosetting pipes manufactured via a filament winding process. The reinforcement is generally glass fiber and the resin (matrix) is a thermoset polymer, traditionally polyester, vinyl-ester, or epoxy depending on the nature of the transported fluids in the pipe and the service temperature. This has led to the development of 3 main product lines for RTR pipes; GRP (Glass Reinforced Polyester), GRV (Glass Reinforced Vinylester) and GRE (Glass Reinforced Epoxy) pipes.

RTR pipes are generally produced in rigid segments of about 10-12 meters in length and transported onsite before being eventually assembled (jointed) to each other to the required length. The historical development of RTR began with the need to replace heavy concrete and steel pipes used in utilities and potable/sewage water systems. However, the use of RTR pipes in higher value applications such as oil and gas (O&G) service (particularly GRE), has gained a great deal of attention and acceptance. Currently, thousands of kilometers of RTR pipes are installed globally (particularly in the Middle East region) on yearly basis to meet the need of critical applications such as high pressure water injection and sour crude oil flowlines. The experience of O&G operators over the last decades has shown that RTR is a mature technology and can be an economical alternative to traditional carbon steel pipes, particularly in view of the fact that RTR pipe is not subject to the same corrosion seen in carbon steel piping. Depending on the manufacturer's product portfolio, RTR line pipes are generally available in diameters ranging from 1½" to 44" and can be designed to handle pressures ranging from 150 psi to 4000 psi and temperatures up to 210° F.

Within the RTR pipe manufacturing industry is well-known that the joint/connection in an RTR pipeline system is often the limiting component towards a higher temperature and pressure operating envelope. The envelope is often defined in terms of the product pressure in view of the diameter (i.e., larger diameter RTR pipe generally cannot handle the same pressure as smaller diameter piping). Indeed, the experience of O&G operators has shown that most failures/leaks in RTR pipe systems are associated with joint failures. This could potentially reduce the confidence in the material and technology.

A number of proprietary joint designs have been developed over the years by the manufacturers, which can generally be grouped into two main types/categories; adhesive/bonded joints and interference joints. The former, adhesive/bonded joints, relies on an adhesive (or a laminate in case of wrapped/laminated joints) to transfer the load from one pipe to another and the performance/limitation of such joints is often associated with proper surface preparation, particularly in field conditions. The latter, interference joints, relies on a solid contact and direct load transfer between the two RTR pipes to be jointed, such as threaded and key-lock joints. A combination of both techniques (i.e, adhesive and interference) is also possible (e.g., the Injected Mechanical Joint—IMJ).

In general, high-pressure RTR pipes make use of interference or mechanical joints (threaded or key-lock joints), while lower pressure ratings can be achieved with adhesive and laminate joints. Examples of interference joints are shown in FIG. 1A, which shows an integral threaded joint, FIG. 1B, which shows a coupled threaded joint, and FIG. 2, which shows a key-lock joint. Referring to FIG. 1A, the joint 100 is formed between a first RTR pipe 102 having a threaded spigot end and a second RTR pipe 104 having a threaded socket end. Referring to FIG. 1B, joint 110 is formed between a first RTR pipe 112 having a threaded spigot end and a second RTR pipe 114 also having a threaded spigot end by employing a coupler pipe 116 having threaded socket ends. Referring to FIG. 2, joint 200 is formed between an RTR pipe 202 having a spigot end and an RTR pipe 204 having a socket end using locking strips 206 and a rubber sealing (O-ring) 208.

SUMMARY OF INVENTION

One or more embodiments of the present invention relate to a system for coupling pipes comprising: a first pipe having a tapered, spigot end; a second pipe having a tapered, spigot end; wherein the first pipe and the second pipe are made from a reinforced thermosetting resin (RTR), a coupler having two tapered socket ends adapted to internally receive the respective tapered, spigot ends of the first pipe and the second pipe, the coupler comprising a resistive element implanted therein and connected to electrodes extending to an exterior of the coupler, wherein a thermoplastic material is disposed between an exterior of the first pipe and an interior of the coupler, wherein a thermoplastic material is disposed between an exterior of the second pipe and the interior of the coupler, wherein, upon application of electricity to the electrodes, the resistive elements are heated sufficiently to melt the thermoplastic material such that, when the heat is removed, the hardened thermoplastic material seals the first pipe and the second pipe to the coupler.

One or more embodiments of the present invention relate to a method of coupling a first pipe and a second pipe with a coupler, wherein the first pipe and the second pipe are made from a reinforced thermosetting resin (RTR) and each have a tapered, spigot end, wherein the coupler has two tapered socket ends adapted to internally receive the respective tapered, spigot ends of the first pipe and the second pipe, the coupler comprising a resistive element implanted therein and connected to electrodes extending to an exterior of the coupler, the method comprising: disposing a thermoplastic material between an exterior of the first pipe and an interior of the coupler; disposing a thermoplastic material between an exterior of the second and an interior of the coupler; inserting the first pipe and the second pipe into the coupler; and applying of electricity to the electrodes such that the resistive elements heat sufficiently to melt the thermoplastic material such that, when the heat is removed, the hardened thermoplastic material seals the first pipe and the second pipe to the coupler.

Other aspects and advantages of the invention will be apparent from the following description and the appended claims.

DETAILED DESCRIPTION

Threaded joints are traditionally used for high pressure RTR pipes. These can be either "integral" (i.e., a connection that does not use a joining member/coupler to transfer the load from one pipe to the other) or using a "coupler." Although threaded joints can achieve outstanding performance, in terms pressure rating and sealing capacity, the experience of O&G operators has shown that failures can happen. The general opinion is that the failures are associated with improper installation by the jointers (pipe misalignment, over-torqueing, improper/insufficient taping of the thread compound—TEFLON® (a trademark of the The Chemours Company FC, LLC), etc.).

Figure 1A:
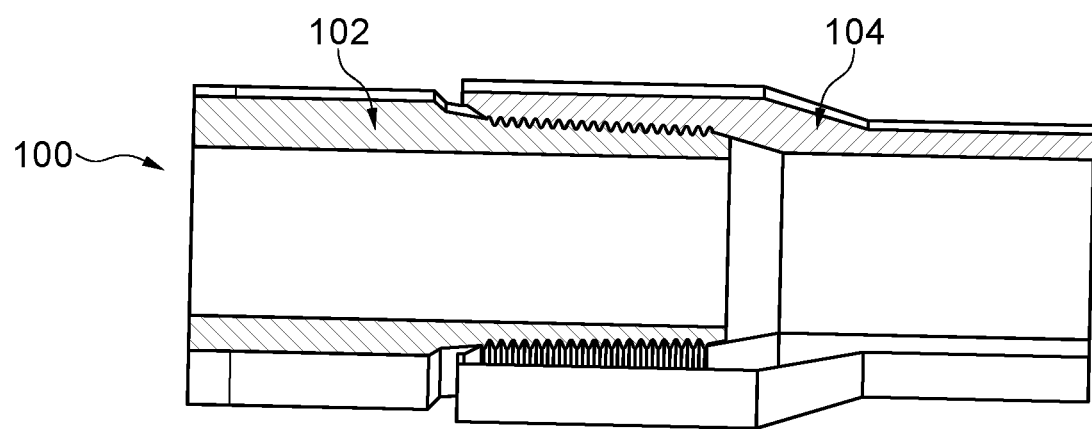
FIGS. 1A and 1B show an integral and a coupled threaded joint, respectively.
Figure 1B:
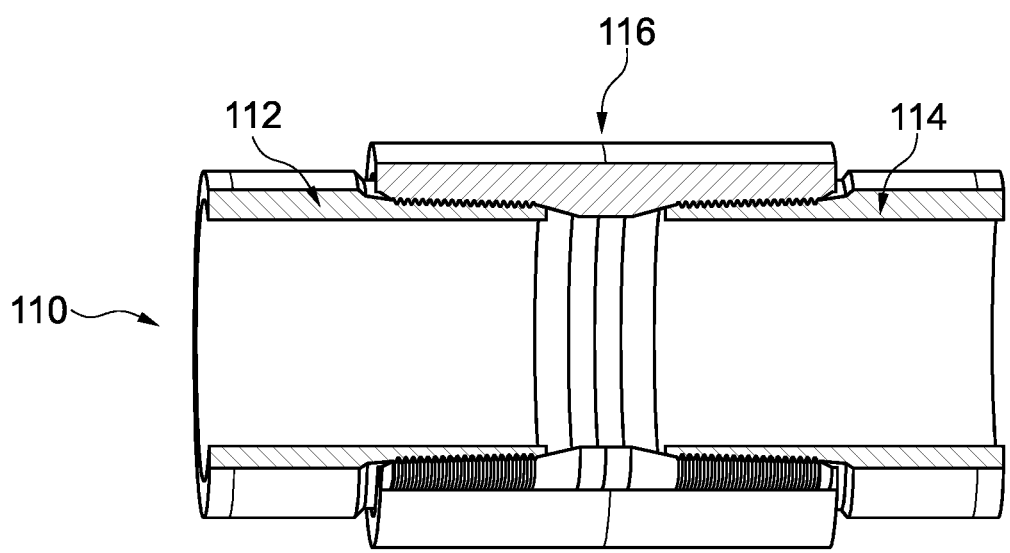
Figure 2:
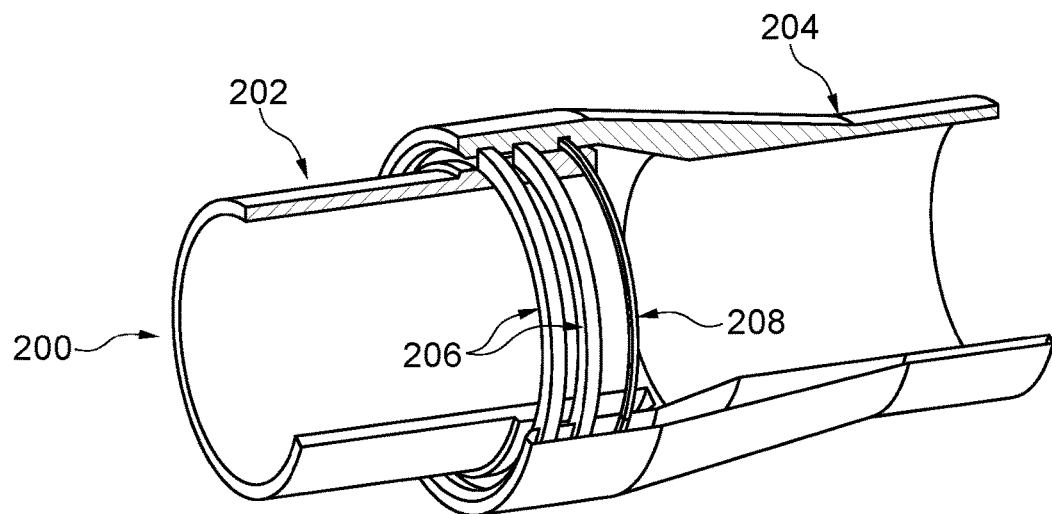
FIG. 2 shows a key-lock joint.
Figure 3:
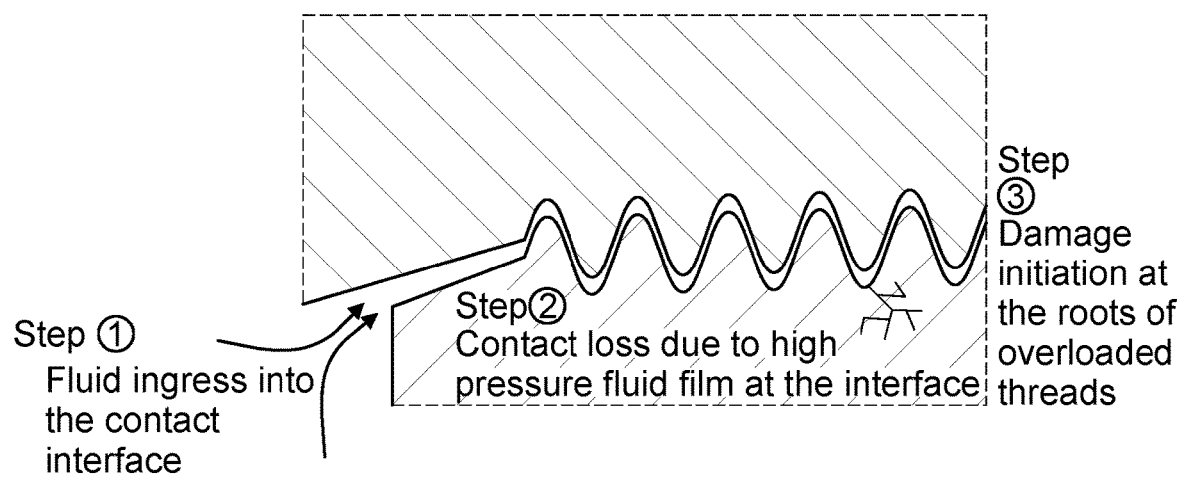
FIG. 3 is a schematic representation of overloading failure of threaded RTR connections.

A typical failure mechanism is illustrated in FIG. 3. A poor installation can result in imperfections/cavities along the contact surface between the spigot and the socket. In operation, fluid (e.g., water) at high pressure and high temperature could ingress into these cavities (step #1) and create a high pressure fluid film (step #2) which would slowly propagate along the spigot-socket interface. In some cases, the creep of the resin at the interface can aggravate the water propagation at the interface. As the ingress progresses, the contact pressure on the initial threads is eliminated and the excess load is transferred to the nearby threads, which eventually leads to overloading failure (step #3).

One or more embodiments of the present invention introduce a new jointing technique that will reduce, and potentially eliminate, failures and increase the confidence in the RTR pipe technology. The ultimate target for such embodiments is to replace current jointing technologies for RTR pipes (low and high pressure) with a maximum operating envelope up to 24" at 1500 psi pressure rating and service temperatures above 200° F.

Therefore, one or more embodiments of the present invention relate to a system and method for jointing of high pressure reinforced thermosetting resin (RTR) pipes using electrofusion welding process, also referred to as resistive implant welding. More specifically, one or more embodiments relate to a system and method for advanced coupling and sealing of high pressure reinforced thermosetting resin (RTR) pipes. The system comprises: (1) two "weldable" RTR pipes with tapered spigot ends coated with a tie layer (interlayer) comprising at least a thermoplastic material and (2) a "weldable" RTR coupler with tapered socket ends coated with a tie layer comprising at least a thermoplastic material and resistive implant elements. In one or more embodiments, the RTR coupler is replaced by a reinforced thermoplastic electrofusion coupler that meets the same technical requirements. Additionally, a method of jointing/coupling the two RTR pipes includes: (1) pushing the two RTR pipes into the tapered reinforced coupler (to ensure the tie layers are compressed against each other) followed by (2) fusion welding of the pipes to the coupler using resistive welding (electrofusion).

Figure 4:
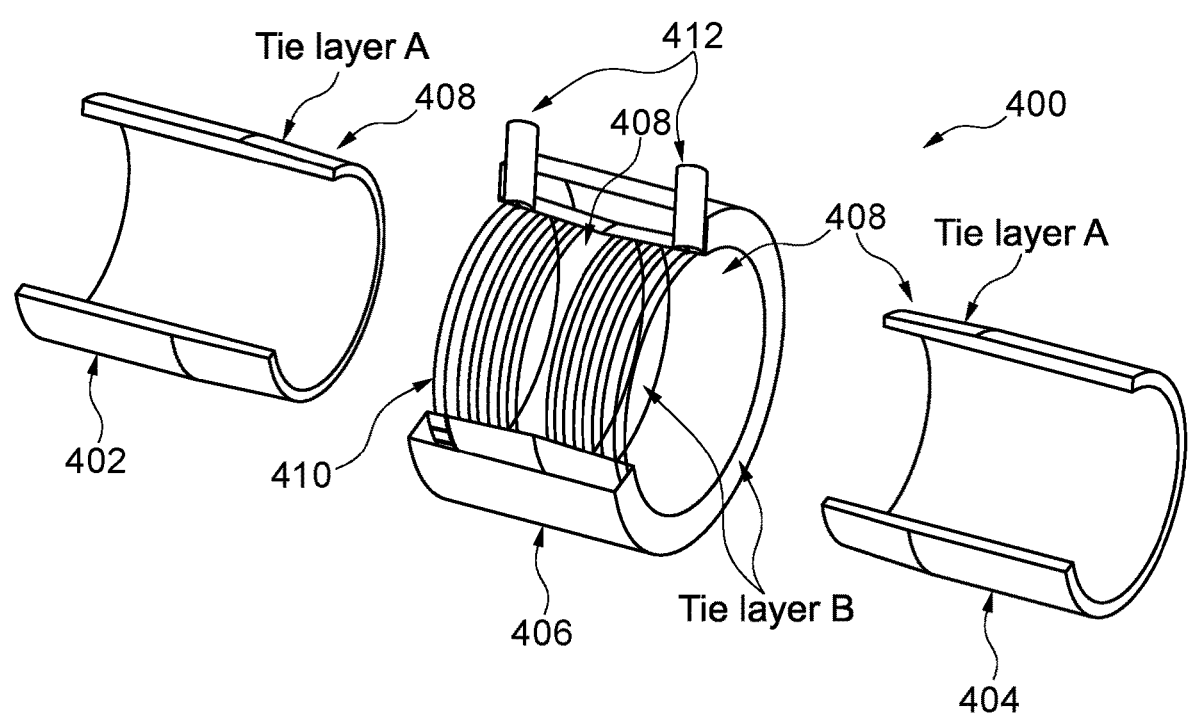
FIG. 4 is a schematic 3D representation of an RTR jointing system in accordance with an embodiment of the present invention.
Figure 5:
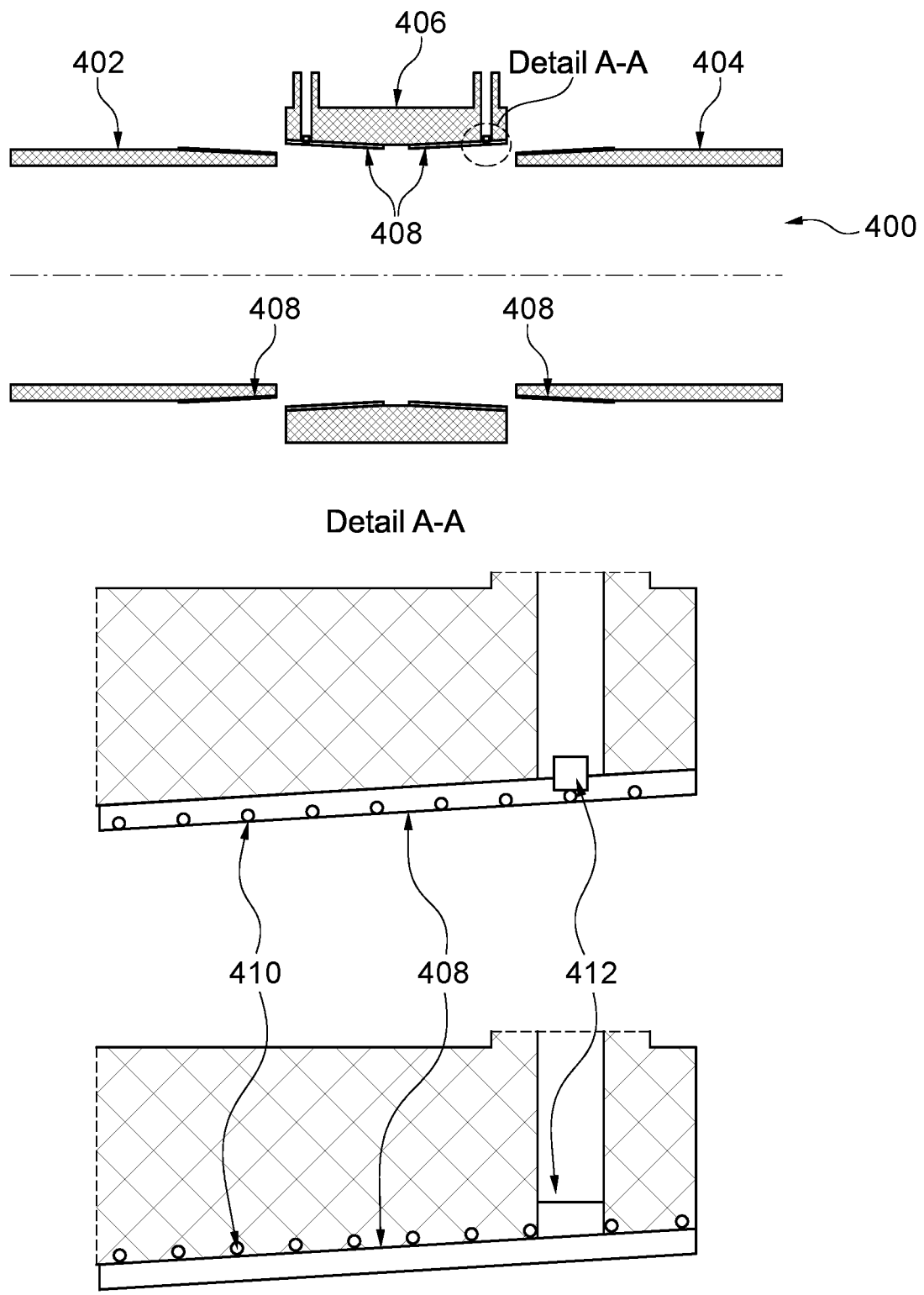
FIG. 5 is a schematic cross-section representation of an RTR jointing system in accordance with an embodiment of the present invention with different position for the resistive implants.

An exemplary system in accordance with one or more embodiments is schematically presented in FIG. 4 and FIG. 5. As can be seen, a joint 400 is being formed between a first RTR pipe 402 with a tapered spigot portion (end) coated with a tie layer comprising at least a thermoplastic material (tie layer A) 408 and a second RTR pipe with a tapered spigot portion (end) coated with a tie layer comprising at least a thermoplastic material (tie layer A) 408 by employing a reinforced thermoset (RTR) coupler pipe 406 with a tapered socket portions (ends) coated with a tie layer comprising at least a thermoplastic material (tie layer B) 408 and incorporating resistive implant elements (such as metallic coils, sheet, meshes, etc.) 410. The resistive implant elements 410 are connected to electrodes 412, which extend from the coupler pipe 406.

The main role of the tie layers (A and B) is to make the thermoset parts "weldable" and, therefore, enable the permanent interlock of the spigots to the coupler. On top of that, the thermoplastic interlayers (or tie layers) will provide the required sealing to the joint upon completion and will eliminate the need for a secondary sealing system, such as O-rings. The axial length of the bonding line (i.e., the length of the coupler) must be large enough to provide the required joint strength (a larger coupler length gives a larger surface area to transfer the load and increases the overall strength, as defined by the load bearing capacity of the joint).

Those skilled in the art will appreciate various methods can be used to apply and bond the tie layers to the thermoset parts. Several techniques, such as thermal spraying a thermoplastic powder on the faying surface of the thermoset (with sufficient surface preparation, e.g., sand blasting) or applying a thermoplastic implant while the thermoset is in a partially cured (or uncured) state, followed by co-curing at the required temperature (below the melting temperature of the thermoplastic) may be employed in different embodiments. In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

The thermoplastic materials 408 used on the tie layers can either be the same or different in A and B, but must necessarily be weldable to each other (e.g., have very close melting/solidification temperatures and be melt compatible, i.e., mix well when molten). In addition, such thermoplastic materials must be carefully selected to ensure their function throughout the lifetime of the pipe (typically, 25 years). For example, the materials must be qualified (e.g., as per ISO 23936) to meet the service specifications in terms of design temperature, pressure and chemical compatibility with the environment (acidic gases, liquids, aromatics contents, etc.). Examples of thermoplastics that can be considered, include but are not limited to (i.e., non-exhaustive list), are HDPE, PE-RT, PVDF, PEEK, PEKK, PA12, POK among other thermoplastic resins commonly used in the O&G industry.

As schematically illustrated in FIG. 5, the resistive implant elements 410 can either be (i) incorporated within the thermoset RTR coupler 406 adjacent to the thermoplastic tie layer (tie layer B) 408 or (ii) within the thermoplastic tie layer (tie layer B) 408 itself near the fusion line/surface. The selection of one variant over the other will depend (among others) on the coupler manufacturing process and the characteristics of the thermoplastic polymer used for the thermoplastic tie layers 408. In the first case (i), the resistive implements can be incorporated during the filament winding process when manufacturing the RTR coupler 406, which is particularly adapted for the case where metallic wires are used as implants. The second case (ii) is particularly adapted when using a thermoplastic polymer tie layer with high melting temperature (such as PEEK). Indeed, in such case, the large amount of heat required to melt the tie layer material could result in degradation of the RTR resin and reinforcements in the coupler. Therefore, the heat generation source (i.e, the resistive implants 410) must be localized near the fusion line (near the free surface of the tie layer).

Figure 6:
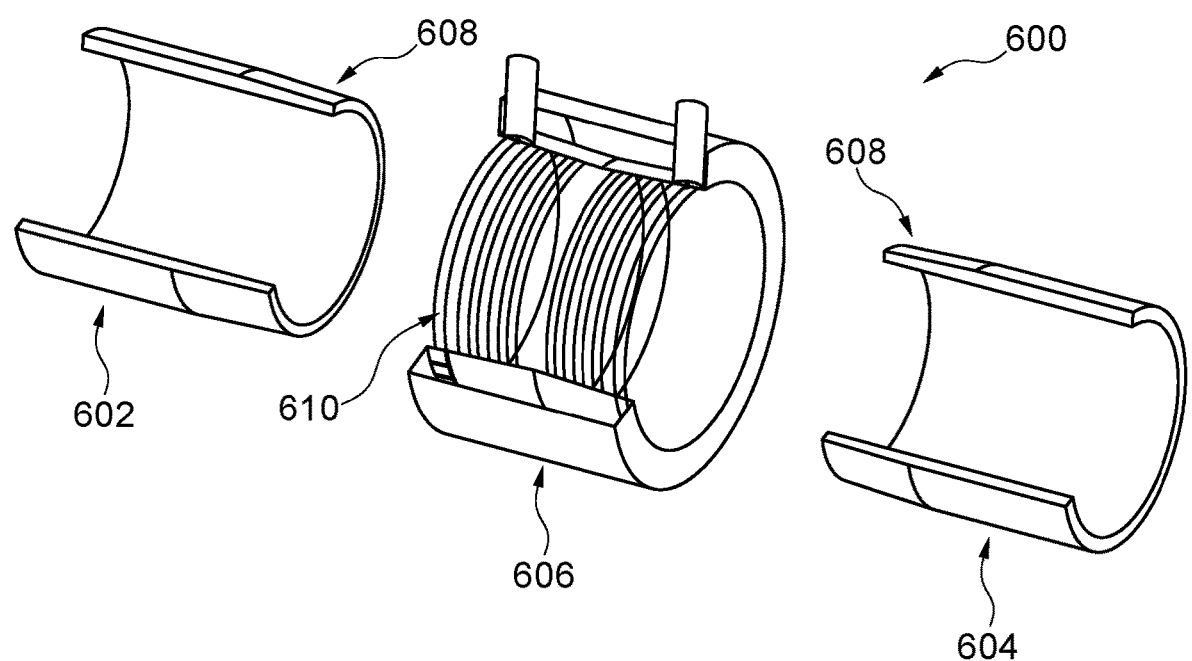
FIG. 6 is a schematic 3D representation of an RTR jointing system in accordance with an embodiment of the present invention.

In one or more embodiments, a variant to the system described earlier is illustrated in FIG. 6. A joint 600 is formed between RTR pipe 602, RTR pipe 604, and coupler pipe 606, in which the coupler pipe 606 is made of a reinforced thermoplastic material incorporating resistive implant elements 410. Such a configuration eliminates the need for a thermoplastic tie layer (tie layer B) 608 inside the coupler 606. In one aspect, this configuration could be easier to adopt because reinforced thermoplastic electrofusion couplers are readily available (although, in another aspect, an RTR coupler is likely to be a more cost effective, but at the expense of an additional step to make the coupler "weldable"). The particular coupler material used can be selected according to two main criteria: (1) proper weldability to the thermoplastic material used in tie layer A, and (2) meeting the minimum required long term performance of the joint (strength, stiffness, chemical resistance, and permeation barrier).

Those skilled in the art will appreciate that the exemplary embodiments disclosed are merely schematic illustrations and that many other variations may be made in design or geometry (e.g., use of metallic sheet or mesh instead of coiled wires, thermally sprayed metallic sheet, etc.) without departing from the scope of the present invention. In particular, although the figures show that the thermoplastic tie layer inside the RTR coupler is broken into two individual tie layers (one on each taper end), a single tie layer extending from one end to the other may be used in one or more embodiments. Such a configuration would be practical to manufacture and may provide additional fluid permeation barrier to the RTR coupler.

Figure 7A:
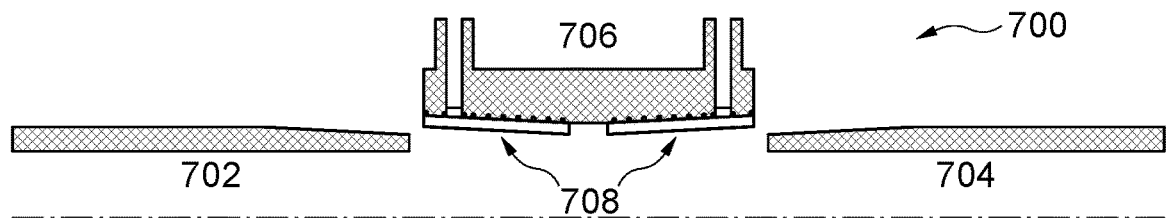
FIGS. 7A-7C are schematic cross-section representations of an RTR jointing system in accordance with an embodiment of the present invention with different position for the resistive implants.
Figure 7B:
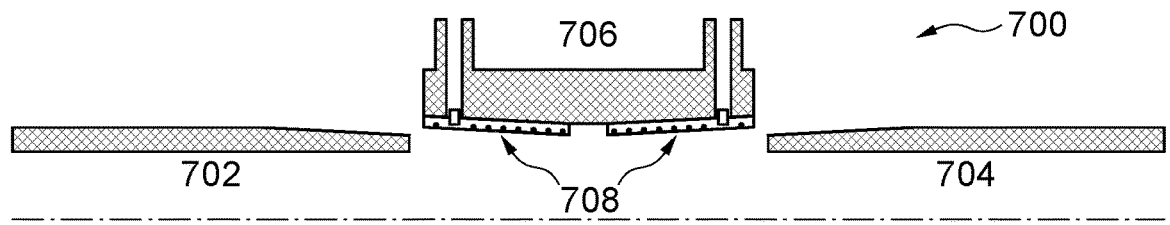
Figure 7C:
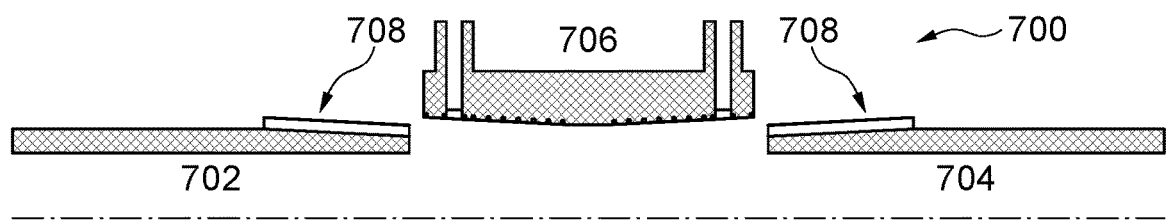

As schematically illustrated in FIGS. 7A-7C, in another potential variation, a single "thick" thermoplastic inter-layer 708 may be used on one face of the joint 700 only (i.e, either the RTR pipe 702, 704 side or on the coupler 706 side), leaving the other side uncoated. Provided that sufficient surface preparation is performed on the uncoated RTR pipe 702, 704 joining (e.g., abrasion), the joining process described below will lead the thermoplastic interlayer to fuse and bond (physically and/or chemically) to the uncoated RTR part. Although this variant eliminates the requirement for coating both sides of the RTR joint 700, which can be challenging in some circumstances, embodiments employing such a variation may negatively affect performance in terms of bonding strength.

A method of assembling any of the systems described above is illustrated in FIG. 8. As those of skill in the art will appreciate, the same procedure can be followed for any of the system variants presented. The assembly method involves a conventional electrofusion welding process, which will not be described in detail herein.

Figure 8:
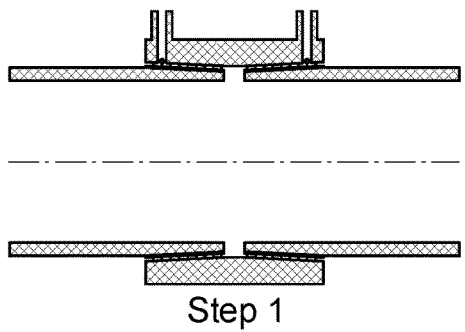
FIG. 8 is a schematic description of a method of assembling a coupling system in accordance with embodiments of the present invention.
Figure 8:
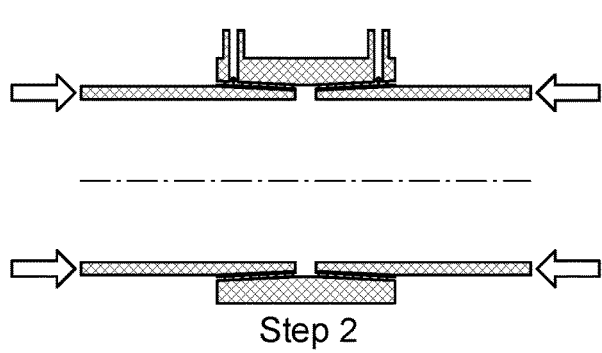
Figure 8:
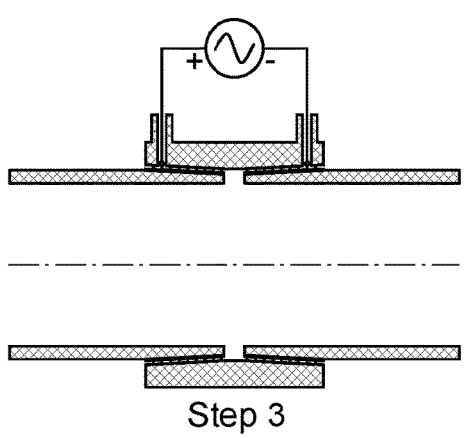

Referring to FIG. 8, upon taking sufficient precautions at the installation site to make sure that the two RTR pipes are properly aligned (Step 1), the pipes are pushed into the reinforced coupler to bring the thermoplastic layers into contact with each other (Step 2). The pipe and coupler ends must have enough geometry (here "tapered" as an example) to allow sufficient contact (compression) between the thermoplastic interlayers and the coupler and maintain contact throughout the joining process. The last step (step 3) is the electrofusion of the coupler to the RTR pipes (an electric current is passed through the resistive implants to generate enough heat to melt part of the thermoplastic layers on the pipes and the coupler, and upon solidification, a joint is formed). Note that in step 3, AC current is shown for illustration purposes only and DC current could also be used during the electrofusion process.

Following a controlled cooling (the degree of crystallinity in the thermoplastic layer may be dependent on the rate of cooling) and full solidification, the RTR pipes are joined and also sealed. The thermoplastic interlayer will act as a (1) load transfer from one pipe to the other, and also, (2) as a barrier to prevent any permeation and/or leak of the transported fluids. This eliminates the need for secondary sealing mechanism, such as O-rings.

It is worth noting that the tie layer will mainly be subject to axial load/stresses during pipe operation (hoop stresses are mainly carried by the RTR pipes and the reinforced coupler). Therefore, the length of the reinforced coupler (i.e., the total contact surface between the coupler and the pipes) must properly designed (i.e., large enough) to ensure the shear load on the thermoplastic interlayers does not exceed their capacity. The latter being mainly dependent on the shear strength of the thermoplastic material used and to the bonding strength between the tie layers and the RTR parts.

One or more embodiments of the present invention as described above may solve one or more of the following problems or provide one or more of the following advantages.

Advantageously, there is an important "by-product" of the systems disclosed herein, which is related to the prevention of electrostatic discharge (ESD) in composite pipes. ESD is a well-known problem in plastic pipes (and non-conductive pipes in general) used in gas transportation and is related to the accumulation of static charge/electricity along the pipe length due to the electric interaction between suspended solid particles (e.g., sand) or water droplets in the gas stream. Such static electricity, which normally is dissipated to the ground in conventional metallic pipes (conductors) cannot be dissipated in plastic/composite pipes. Accordingly, the static electricity accumulates along the length of the pipe and then can discharge at downstream metallic components (valves or tanks), possibly creating a failure. One solution to this problem lies in making the pipes, or a portion of the pipeline, electrically conductive in order to dissipate the static charges.

Figure 9:
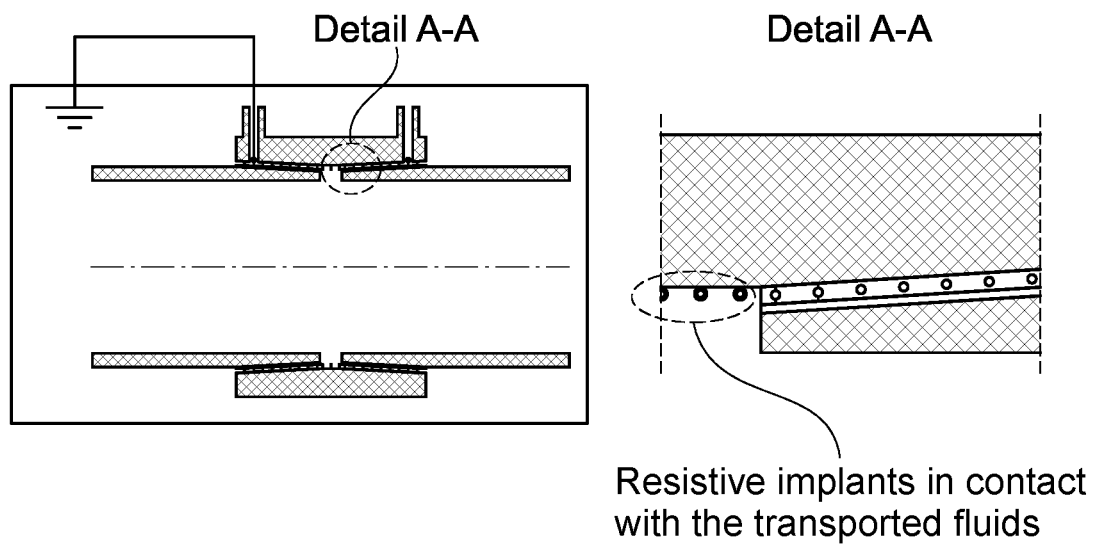
FIG. 9 is an illustration of using a system in accordance with embodiments of the present invention as a means to mitigate electrostatic discharge (ESD) and dissipate accumulated static charges.

A by-product of the systems described herein involves using the RTR joints, which are distributed on a regular distance along the pipe length, as a means to locally discharge the accumulated static electricity. Indeed, as illustrated in FIG. 9, the idea consists of exposing some of the resistive implants to the free surface (i.e., allowing contact with the transported fluids) at the inner surface of the pipe and connecting the electrofusion terminal to the ground post installation. By doing so, a conductive/electric path to the electric charges to flow from the inner surface of the pipe to the external ground is provided.

Additionally, systems described herein are advantageous because it is known that the integrity of conventional RTR joints (threaded or adhesive joints) is highly dependent on the skills of the jointer during installation. For example, a joint misalignment, improper application of TEFLON® compound on the threads or excessive torqueing during the joint installation will inevitably impact the interference (contact) pressure between the spigot and socket threads. Further, the degradation of the sealing systems (secondary O-rings) used in some of the joints (e.g., key lock) are known to be the main source of leaks. Thus, the alternative way of joining RTR pipes through a welding process as is described herein simplifies the process and avoids such problems. Also, electrofusion welding is a most efficient and effective joining solution for standalone thermoplastic pipes (mainly polyethylene), reinforced thermoplastics, and the like.

One or more embodiments may provide improved sealing and reliability over prior systems. The sealing is entirely provided by the thermoplastic tie layers after welding. In conventional joints, the sealing is provided by a contact pressure (O-ring for key lock-joints or TEFLON® wrap in threaded joints). The contact pressure degrades over time and joints end up leaking. In embodiments of the present invention, the sealing is permanent (welded). In addition, the effective joining area is larger and thus the permeation path is longer, resulting in a lower long term leak of harmful substances to the environment.

One or more embodiments may provide increased joint strength provided by a larger joining area (i.e., the length of the coupler) and controlled mainly by the strong bonding between the thermoplastic interlayer to thermoset parts.

One or more embodiments may allow for de-skilled installation, as compared to conventional joints, where the quality of the joints often depends on the skills of the jointer (surface treatment, injection of resin, proper application of TEFLON® sealing compound on-site, installation of O-ring, torqueing, etc.). In embodiments of the present invention, the application of the tie layers at the pipe ends can be done at the manufacturing site (controlled production) and the skills required by the jointer at the installation site are reduced. Also, the electrofusion welding process can be automated.

One or more embodiments provide versatility. With the potential to easily change the joint design and performance, even on-site, through modification of the pipe end taper geometry. Embodiments of the present invention make the joint easily repairable on-site (thermoplastic welding is a reversible process unlike thermoset curing). In addition, embodiments of the present invention can be possibly used as a repair technique on straight sections of RTR pipes. The latter must be modified on-site to incorporate the connecting coupler and the thermoplastic interlayers.

One or more embodiments provide ESD risk mitigation. Embodiments of the systems described herein can be used to dissipate static charges and mitigate the risk for ESD.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for coupling pipes comprising:
a first pipe having a tapered, spigot end;
a second pipe having a tapered, spigot end;
wherein the first pipe and the second pipe are made from a reinforced thermosetting resin (RTR), and
a coupler having two tapered socket ends adapted to internally receive the respective tapered, spigot ends of the first pipe and the second pipe, the coupler comprising a resistive element implanted therein and connected to electrodes extending to an exterior of the coupler,
wherein the tapered, spigot ends of the first and second pipe, and the tapered socket ends of the coupler are coated with a tie layer comprising at least a thermoplastic material,
wherein the resistive element is implanted adjacent to the tie layer of the coupler,
wherein, upon application of electricity to the electrodes, the resistive element is heated sufficiently to melt the thermoplastic material such that, when the heat is removed, the hardened thermoplastic material seals the first pipe and the second pipe to the coupler, and
wherein a portion of the resistive element is exposed to contact fluids transported within the first pipe and the second pipe.

2. The system of claim 1, wherein the coupler is made of the reinforced thermoplastic material.

3. The system of claim 1, wherein the resistive element is a metallic coil.

4. The system of claim 3, wherein the resistive element is at least a portion of the metallic coil directly exposed to the interior of the coupler.

5. A method of coupling a first pipe and a second pipe with a coupler, wherein the first pipe and the second pipe are made from a reinforced thermosetting resin (RTR) and each have a tapered, spigot end, wherein the coupler has two tapered socket ends adapted to internally receive the respective tapered, spigot ends of the first pipe and the second pipe, the coupler comprising a resistive element implanted therein and connected to electrodes extending to an exterior of the coupler, wherein a portion of the resistive element is exposed to contact fluids transported within the first pipe and the second pipe, the method comprising:
coating the tapered, spigot ends of the first and second pipe, and the tapered socket ends of the coupler with a tie layer comprising at least a thermoplastic material, such that the resistive element is implanted adjacent to the tie layer of the coupler,
inserting the first pipe and the second pipe into the coupler; and
applying of electricity to the electrodes such that the resistive elements heat sufficiently to melt the thermoplastic material such that, when the heat is removed, the hardened thermoplastic material seals the first pipe and the second pipe to the coupler.

6. The method of claim 5, wherein the coupler is made of the thermoplastic material.

7. The method of claim 5, wherein the resistive element of the coupler is a metallic coil and at least a portion of the metallic coil is exposed to the interior of the coupler, the method further comprising connecting the electrodes of the coupler to ground so as to discharge static electricity built up on the first pipe or the second pipe.

* * * * *